3,062,620
PHOSPHATE PRODUCTION
Duane Sawhill, Joliet, Ill., assignor to Olin Mathieson Chemical Corporation, Joliet, Ill., a corporation of Virginia
No Drawing. Filed Apr. 13, 1959, Ser. No. 805,691
3 Claims. (Cl. 23—107)

This invention relates to phosphate manufacture and particularly to a method for the production of monopotassium phosphate.

The commercial potentialities of potassium phosphates have long been recognized. These materials are well adapted for use as fertilizers, heavy duty liquid detergents, liquid soap formulations, sequestering agents, and for many other applications. They have not been used extensively in commerce because all previous processes for their manufacture have involved expensive raw materials, uneconomical procedures or incomplete conversion of the reactants to the desired products.

In order to avoid the utilization of high cost raw materials such as potassium hydroxide and phosphoric acid, previous attempts have been made to obtain economical monopotassium phosphate from monosodium phosphate and potassium chloride. Such methods involve the following reaction:

$$KCl + NaH_2PO_4 \rightarrow KH_2PO_4 + NaCl$$

One such prior art process utilizing this reaction entailed repeatedly cooling the reaction mixture to fractionally crystallize a portion of the monopotassium phosphate and evaporating the mother liquor between each crystallization step to precipitate sodium chloride. The cost of operating such a process is prohibitive. More recently, processes have been developed in efforts to circumvent such manufacturing drawbacks. In accordance with such processes, however, sodium phosphates are obtained as undesirable by-products due to the neutralization of the mother liquor after removing the monopotassium phosphate therefrom. Thus, these prior art processes do not provide methods in which all of the phosphate values are converted to potassium phosphates.

It is, therefore, an object of this invention to provide a process for the manufacture of monopotassium phosphate overcoming the disadvantages of the prior art. It is also an object of this invention to provide a process for the manufacture of monopotassium phosphate in which substantially all of the potassium and phosphate values of the reactants are converted to monopotassium phosphate. A more specific object of this invention is to provide a cyclic process for the manufacture of monopotassium phosphate from monosodium phosphate and potassium chloride.

In accordance with this invention, these and other objects are accomplished by reacting potassium chloride with monosodium phosphate in an aqueous solution, separately crystallizing the monopotassium phosphate and sodium chloride and then fortifying the mother liquor with monosodium phosphate and potassium chloride for a repetition of the process. More specifically, this invention contemplates dissolving potassium chloride in a hot monosodium phosphate solution. After the potassium chloride has been completely dissolved, the solution is cooled to effect fractional crystallization of the monopotassium phosphate which can be recovered by any conventional means. After removal of the crystallized monopotassium phosphate, the mother liquor is evaporated, thus precipitating sodium chloride which is also removed from the mother liquor. The mother liquor is then recycled and mixed with potassium chloride and a solution of monosodium phosphate for recycling.

Optimum results are obtained with a 40° Baumé monosodium phosphate solution measured at 80° C. This corresponds to a concentration of about 43.5%. For efficiency of operation, the molecular equivalent weight of crystalline potassium chloride is added to the monosodium phosphate solution. The concentration of the monosodium phosphate solution can vary widely, but it is difficult to dissolve potassium chloride in more concentrated solutions, whereas more dilute solutions give reduced yields and merely increase the bulk of the liquor being processed. Thus, it is preferred to maintain the concentration of the monosodium phosphate solution between about 41% and 45%. In order to expedite the solution and reaction of the potassium chloride, the reaction mix should be maintained at a temperature above approximately 100° C. and it is preferably kept at its boiling point, about 110° C.

The monopotassium phosphate is removed from the sodium chloride in the mother liquor by crystallization. This is accomplished by cooling the solution to temperatures less than about 35° C. where the solubility of the phosphate is considerably less than at 110° C. The solubility of sodium chloride is relatively unaffected by temperature. Although the amount of monopotassium phosphate crystallized from the mother liquor will increase as the temperature is decreased below 35° C., for economic reasons, it is preferred to cool the solution only to about 20° C. during the crystallization step. Each such fractional crystallization provides a yield of about 68% monopotassium phosphate coated with a small amount of sodium chloride which can be reduced to 0.03% or less by washing with cold water. The wash water is preferably added to the mother liquor to minimize loss. Thus, in each cycle of the process of this invention, a 60% yield of substantially pure monopotassium phosphate is readily obtained. Since substantially all of the potassium and phosphorus in the reactants remain in the system, a yield of monopotassium phosphate closely approximating 100% is readily attainable. In general practice, however, the yield is reduced to 97% to 98% due to losses in removal of the sodium chloride.

After removal of the monopotassium phosphate, the mother liquor and washings are combined and then evaporated. Since a major portion of the monopotassium phosphate has been removed from solution, the mother liquor and washings may be evaporated throwing sodium chloride out of solution without precipitating monopotassium phosphate. To keep the system in balance, the amount of sodium chloride precipitated is preferably equivalent to the amount of monopotassium phosphate taken out of solution. Thus, when a 60% yield of monopotassium phosphate is obtained, 60% of the sodium chloride is crystallized and removed from the mother liquor before recirculation to the original mix. This equilibrium point is reached when the $P_2O_5$ content of the concentrated mother liquor is about 30.3 grams/100 ml. which is equivalent to a concentration of about 38.7% monopotassium phosphate. The weight ratio of chlorine to $P_2O_5$ in solution is then 1:2, the same as in the original reaction mixture. The precipitated sodium chloride is then washed with hot water which is mixed with the mother liquor. This balanced liquor can then be added to the reaction mixture for the preparation of additional monopotassium phosphate.

The manner in which these and other objects are accomplished in accordance with this invention will be readily understood by reference to the following description. Unless otherwise specified, all proportions in this example and throughout the specification are expressed in parts by weight.

About 1,000 parts of a 43.5% solution of technical grade monosodium phosphate were mixed with about 931 parts of a mother liquor containing about 329 parts monopotassium phosphate and about 141 parts sodium chloride and the mixture brought to its boiling point, approximately 110° C. To the boiling solution was added approximately 270 parts of crystalline potassium chloride. This material dissolved quite readily and the solution was maintained at its boiling point until the potassium chloride was completely solubilized. The reaction mixture was then transferred to a crystallizer in which it was cooled to about 20° C. This resulted in the crystallization of about 558 parts of monopotassium phosphate which were removed by centrifugation. These crystals were washed with approximately 640 cc. of ice water at a temperature of about 2° C. to remove sodium chloride adhering to their surfaces. After washing, approximately 492 parts of substantially pure monopotassium phosphate containing a maximum of 0.03% chlorine as an impurity were obtained. The product obtained is in fine crystalline form and is suitable for use as a fertilizer per se, or can be utilized as a basic material for the manufacture of any of the other potassium phosphates. The ice water washings were added to the mother liquor. In order to keep the system in balance, 60% of the sodium chloride was crystallized from the mother liquor. This was done by evaporating the liquor until it attained a monopotassium phosphate concentration of approximately 38.7% which is equivalent to a $P_2O_5$ concentration of about 20.2%. Approximately 1,256 parts of water were thus removed from the mother liquor by evaporation and the weight ratio of chlorine to $P_2O_5$ in solution returned to approximately 1:2, the same as in the original mix. The large sodium chloride crystals were separated from the hot mother liquor by centrifuging and washed with about 85 parts of hot water which was added to the mother liquor. The mother liquor was then mixed with additional monosodium phosphate solution and potassium chloride and the process above repeated.

From the foregoing description, it is believed that those skilled in the art will readily understand the principles of the invention and its mode of operation and the results accomplished thereby. While the invention has been set forth in some detail, it is to be distinctly understood that it encompasses such variations and modifications as may present themselves to those skilled in the art without departing from the spirit of the invention.

What is claimed is:

1. Cyclic process for the manufacture of monopotassium phosphate and sodium chloride in substantially molecular equivalent amounts, said cyclic process consisting essentially of the steps of:
   (1) dissolving substantially molecular equivalent weights of monosodium phosphate and potassium chloride in a recycle solution containing substantially molecular equivalent amounts of monosodium phosphate and potassium chloride to form a hot, concentrated aqueous solution;
   (2) cooling said aqueous solution to crystallize monopotassium phosphate and separating said crystallized monopotassium phosphate from said aqueous solution;
   (3) concentrating the remaining solution to crystallize sodium chloride therefrom in an amount which is substantially molecularly equivalent to the amount of the separated, crystallized monopotassium phosphate and separating the crystallized sodium chloride from the remaining solution, said remaining solution containing substantially molecular equivalent amounts of monosodium phosphate and potassium chloride, said remaining solution being recycled to the initial step as the said recycle solution.

2. Process of claim 1 in which the temperature of the hot, concentrated solution of step (1) is about 100 to 110° C.

3. Process of claim 1 in which the hot, concentrated solution of step (1) contains about 41 to about 45 percent of monosodium phosphate.

References Cited in the file of this patent
UNITED STATES PATENTS 2,824,785    Merlub-Sobel _____ Feb. 25, 1958
2,824,786    Merlub-Sobel _____ Feb. 25, 1958